(12) United States Patent
Pascenko

(10) Patent No.: US 7,826,200 B2
(45) Date of Patent: Nov. 2, 2010

(54) ELECTROLYTIC CAPACITOR ASSEMBLY CONTAINING A RESETTABLE FUSE

(75) Inventor: Ivan Pascenko, Dolni Cermna (CZ)

(73) Assignee: AVX Corporation, Myrtle Beach, SC (US)

( * ) Notice: Subject to any disclaimer, the term of this patent is extended or adjusted under 35 U.S.C. 154(b) by 451 days.

(21) Appl. No.: 12/054,679

(22) Filed: Mar. 25, 2008

(65) Prior Publication Data

US 2009/0244811 A1    Oct. 1, 2009

(51) Int. Cl.
*H01G 9/00*      (2006.01)

(52) U.S. Cl. .................. 361/523; 361/516; 361/525; 361/528; 361/534; 361/540

(58) Field of Classification Search .................. 361/523, 361/516, 517, 519, 525, 528–529, 534, 540–541; 29/25.01, 25.03
See application file for complete search history.

(56) References Cited

U.S. PATENT DOCUMENTS

| | | | |
|---|---|---|---|
| 3,345,545 | A | 10/1967 | Bourgault et al. |
| 4,085,435 | A | 4/1978 | Galvagni |
| 4,224,656 | A | 9/1980 | Dematos et al. |
| 4,237,441 | A | 12/1980 | van Konynenburg et al. |
| 4,388,607 | A | 6/1983 | Toy et al. |
| 4,534,889 | A | 8/1985 | van Konynenburg et al. |
| 4,545,926 | A | 10/1985 | Fouts, Jr. et al. |
| 4,560,498 | A | 12/1985 | Horsma et al. |
| 4,591,700 | A | 5/1986 | Sopory |
| 4,724,417 | A | 2/1988 | Au et al. |
| 4,774,024 | A | 9/1988 | Deep et al. |
| 4,814,946 | A | 3/1989 | Su |
| 4,935,156 | A | 6/1990 | van Konynenburg et al. |
| 4,945,452 | A | 7/1990 | Sturmer et al. |
| 5,049,850 | A | 9/1991 | Evans |
| 5,099,397 | A | 3/1992 | Edson et al. |
| 5,179,507 | A * | 1/1993 | Iijima .................. 361/534 |
| 5,198,968 | A | 3/1993 | Galvagni |
| 5,216,584 | A * | 6/1993 | Okazaki et al. ............. 361/534 |

(Continued)

FOREIGN PATENT DOCUMENTS

CN      201017878 Y    2/2008

(Continued)

OTHER PUBLICATIONS

Material Safety Data Sheet for Dow Corning® 1101 Emulsion, Dow Corning Corporation, Jan. 9, 2007, 7 pages.

(Continued)

*Primary Examiner*—Nguyen T Ha
(74) *Attorney, Agent, or Firm*—Dority & Manning, P.A.

(57) ABSTRACT

A fused electrolytic capacitor assembly that offers improved performance characteristics in a convenient and space-saving package is provided. More specifically, the fused electrolytic capacitor assembly contains an electrolytic capacitor element and a resettable fuse contained within a case. The capacitor assembly also contains a stress absorbing material that is positioned adjacent to and in contact with the resettable fuse. By selecting a stress absorbing material having a certain modulus and a certain degree of inherent flexibility, the present inventors believe the resettable fuse is better able to expand to its full capacity upon exposure to an excessive current. In this manner, the resettable fuse is able to better function during use.

30 Claims, 3 Drawing Sheets

U.S. PATENT DOCUMENTS

| | | | |
|---|---|---|---|
| 5,250,228 | A | 10/1993 | Baigrie et al. |
| 5,357,399 | A | 10/1994 | Salisbury |
| 5,394,295 | A | 2/1995 | Galvagni et al. |
| 5,457,862 | A | 10/1995 | Sakata et al. |
| 5,469,326 | A | 11/1995 | Kanetake |
| 5,473,503 | A | 12/1995 | Sakata et al. |
| 5,478,965 | A | 12/1995 | Hashiba |
| 5,495,386 | A | 2/1996 | Kulkarni |
| 5,583,740 | A | 12/1996 | Fujino |
| 5,608,602 | A | 3/1997 | Kuriyama |
| 5,661,628 | A | 8/1997 | Yamagami |
| 5,716,420 | A | 2/1998 | Kuriyama |
| 5,729,428 | A | 3/1998 | Sakata et al. |
| 5,805,413 | A | 9/1998 | Kurita |
| 5,812,367 | A | 9/1998 | Kudoh et al. |
| 5,949,639 | A | 9/1999 | Maeda et al. |
| 6,188,566 | B1 * | 2/2001 | Aoyama .................... 361/534 |
| 6,191,936 | B1 | 2/2001 | Webber et al. |
| 6,197,252 | B1 | 3/2001 | Bishop et al. |
| 6,300,862 | B1 | 10/2001 | Ishida |
| 6,322,912 | B1 | 11/2001 | Fife |
| 6,391,275 | B1 | 5/2002 | Fife |
| 6,411,498 | B2 | 6/2002 | Nakamura |
| 6,416,730 | B1 | 7/2002 | Fife |
| 6,507,482 | B2 * | 1/2003 | Harada et al. ............... 361/535 |
| 6,527,937 | B2 | 3/2003 | Fife |
| 6,529,366 | B2 | 3/2003 | Nakamura |
| 6,570,483 | B1 | 5/2003 | Chandler et al. |
| 6,576,099 | B2 | 6/2003 | Kimmel et al. |
| 6,592,740 | B2 | 7/2003 | Fife |
| 6,639,787 | B2 | 10/2003 | Kimmel et al. |
| 6,651,315 | B1 | 11/2003 | Graves et al. |
| 6,665,172 | B1 | 12/2003 | Kim et al. |
| 6,674,635 | B1 | 1/2004 | Fife et al. |
| 6,882,520 | B2 | 4/2005 | Kamigawa et al. |
| 6,972,943 | B2 * | 12/2005 | Kato et al. .................. 361/533 |
| 7,116,548 | B2 | 10/2006 | Satterfield, Jr. et al. |
| 7,220,397 | B2 | 5/2007 | Kimmel et al. |
| 7,262,511 | B2 | 8/2007 | Osako et al. |
| 7,341,705 | B2 | 3/2008 | Schnitter |
| 7,342,775 | B2 | 3/2008 | Hahn et al. |
| 7,729,102 | B2 * | 6/2010 | Kuriyama .................... 361/523 |
| 2005/0013765 | A1 | 1/2005 | Thomas et al. |
| 2005/0103638 | A1 | 5/2005 | Schnitter et al. |
| 2005/0107542 | A1 | 5/2005 | Liu et al. |
| 2007/0109727 | A1 | 5/2007 | Edson et al. |
| 2008/0265326 | A1 | 10/2008 | Hebert |

FOREIGN PATENT DOCUMENTS

| | | |
|---|---|---|
| JP | 1268014 | 10/1989 |
| JP | 2004140137 A | 5/2004 |
| JP | 2006093337 A | 4/2006 |

OTHER PUBLICATIONS

Material Safety Data Sheet for Dow Corning® MH 1107 Fluid 30 CST, Dow Corning Corporation, Jun. 29, 2007, 8 pages.

Product Information Release Dow Corning® 1101 Emulsion from Dow Corning, Jul. 15, 2000, 2 pages.

Technical Data on XCE 80239—One Component, Low Stress, Electrically Conductive, Epoxy Adhesive from Emerson & Cuming, May 1, 2007, 2 pages.

Product Information for Hysol® Die Attach Adhesives from Loctite, 3 pages.

Article—*Adsorption of Gases in Multimolecular Layers*, Brunauer et al., The Journal of the American Chemical Society, vol. 60, 1938, pp. 309-319.

Disclosure of U.S. Patent Application Form.

UK Search Report for GB0900853.3 dated May 13, 2009, 3 pages.

* cited by examiner

ELECTROLYTIC CAPACITOR ASSEMBLY CONTAINING A RESETTABLE FUSE

BACKGROUND OF THE INVENTION

Solid electrolytic capacitors, such as tantalum capacitors, are traditionally known for their high capacitance value and compactness. Fuses are often employed in such capacitors to prevent burning upon exposure to overcurrent conditions. A typical fuse assembly employs a small conductive wire that disintegrates in response to excessive electrical current. Typically, one end of the fuse is soldered to a metal conducting foil edge of an electrolytic capacitor element and the other end of the fuse is soldered to a metal collector bus. When an electrolytic capacitor element fails, it creates a short circuit through which energy stored therein and in the circuit may discharge. The fuse disintegrates in response to the excessive current resulting from this discharge, which breaks the electrical connection between the failed element and the collector bus.

One problem with such conventional fused capacitors, however, is that they can no longer function in the desired manner. In response to these problems, attempts were made to develop capacitors that employed resettable fuses. U.S. Pat. No. 6,882,520 to Kamigawa, et al., for instance, describes solid electrolytic capacitors that contain a current control layer prepared from an insulating polymer (e.g., polyethylene) having electrically conductive particles (e.g., carbon black) admixed therewith. Such materials are often referred to as polymer positive temperature coefficient ("PPTC") fuses. At a temperature associated with a current overload, a PPTC fuse is designed to expand and break the conductive pathways between the conductive particles. Upon cooling, the fuse may contract to close the circuit, thereby rendering the fuse at least partially "resettable." Unfortunately, resettable fuse capacitors, such as described in Kamigawa, et al., are still not completely satisfactory for use in many commercial applications. Without intending to be limited by theory, the present inventors believe that one of the problems with such capacitors is that the resin used to encapsulate the electrolytic capacitor limits the expansion of the resettable fuse to such an extent that it does not function to its full capacity. Further, the thermal stresses induced by expansion of the fuse may also lead to the formation of defects in the encapsulation resin.

As such, a need currently exists for an improved electrolytic capacitor assembly that includes a resettable fuse.

SUMMARY OF THE INVENTION

In accordance with one embodiment of the present invention, a fused electrolytic capacitor assembly is disclosed. The capacitor assembly comprises an electrolytic capacitor element comprising an anode and solid electrolyte overlying the anode, wherein an anode lead extends from the anode; a resettable fuse electrically connected to the electrolytic capacitor element, the resettable fuse containing a positive temperature coefficient ("PTC") material; a stress absorbing material covering at least a portion of the resettable fuse; a cathode termination that is electrically connected to the solid electrolyte; an anode termination that is electrically connected to the anode lead; and a case that encapsulates the electrolytic capacitor element and the resettable fuse and leaves at least a portion of the anode and cathode terminations exposed.

In accordance with another embodiment of the present invention, a method of forming a fused electrolytic capacitor assembly is disclosed. The method comprises providing an electrolytic capacitor element comprising an anode and solid electrolyte overlying the anode, wherein an anode lead extends from the anode; electrically connecting the solid electrolyte to a cathode termination; electrically connecting the anode lead to an anode termination; electrically connecting a resettable fuse to the electrolytic capacitor element, the resettable fuse containing a positive temperature coefficient ("PTC") material; covering at least a portion of the resettable fuse with a stress absorbing material; and encapsulating the electrolytic capacitor element and the resettable fuse so that at least a portion of the anode termination and the cathode termination remains exposed.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
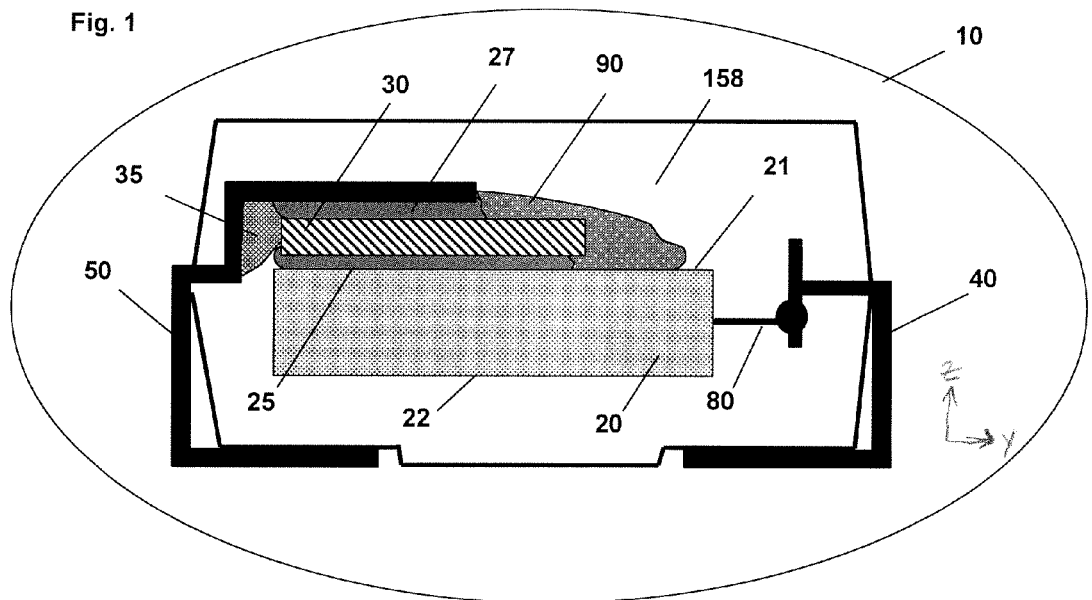
FIG. 1 is a perspective view of a fused capacitor assembly in accordance with one embodiment of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a fused electrolytic capacitor assembly that offers improved performance characteristics in a convenient and space-saving package. More specifically, the fused electrolytic capacitor assembly contains an electrolytic capacitor element and a resettable fuse contained within a case. The capacitor assembly also contains a stress absorbing material that is positioned adjacent to and in contact with the resettable fuse. By selecting a stress absorbing material having a certain modulus and a certain degree of inherent flexibility, the present inventors believe the resettable fuse is better able to expand to its full capacity upon exposure to an excessive current. In this manner, the resettable fuse is able to better function during use. In this regard, various embodiments of the present invention will now be described in more detail.

I. Electrolytic Capacitor Element

The electrolytic capacitor element may be formed using any of a variety of techniques. For example, the electrolytic capacitor element typically contains an anode formed from a valve metal composition. The valve metal composition may have a high specific charge of about 5,000 µF*V/g or more, in some embodiments about 25,000 µF*V/g or more, and in some embodiments about 40,000 µF*V/g or more, and in some embodiments, from about 70,000 to about 200,000 µF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate formation of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

Once formed, the resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode body may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.2 to about 3 millimeters, and in some embodiments, from about 0.4 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the passed charge (current multiplied by time) and thereby the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be synthesized on a surface of the anode and/or within its pores.

Once the dielectric layer is formed, a protective coating may optionally be applied, such as one made of a relatively insulative resinous material (natural or synthetic). Such materials may have a specific resistivity of greater than about 0.05 $\Omega$/cm, in some embodiments greater than about 5, in some embodiments greater than about 1,000 $\Omega$/cm, in some embodiments greater than about $1\times10^5$ $\Omega$/cm, and in some embodiments, greater than about $1\times10^{10}$ $\Omega$/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al, which is incorporated herein in its entirety by reference thereto for all purposes.

The anodized part is thereafter subjected to a step for forming cathodes according to conventional techniques. In some embodiments, for example, the cathode is formed by various techniques, such as pyrolytic decomposition of manganese nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode of the capacitor. The conductive polymer coating may contain one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is BAYTRON C, which is iron III toluene-sulfonate and sold by H.C. Starck. BAYTRON C is a commercially available catalyst for BAYTRON M, which is 3,4-ethylene dioxythiophene, a PEDT monomer also sold by H.C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., BAYTRON C) may also be mixed with the material(s) used to form the optional protective coating (e.g., resinous materials). In such instances, the anode part may then be dipped into a solution containing the monomer (BAYTRON M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 Volts and then dipped in sulfuric acid and applied with about 2 Volts. In this embodiment, the use of the second low voltage sulfuric acid solution or toluene sulfonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

Once the cathode is formed, the part may optionally be applied with a carbon layer (e.g., graphite) and silver layer, respectively. The silver coating may, for instance, act as a solderable conductor, contact layer, and/or charge collector for the capacitor element and the carbon coating may limit contact of the silver coating with the solid electrolyte. Such coatings may cover some or all of the solid electrolyte.

II. Resettable Fuse

The resettable fuse of the present invention includes a positive temperature coefficient ("PTC") material that exhibits electrical resistivity that increases with increasing temperature. As the PTC material is heated due to electrical current, negative feedback results from increased resistance, which in turn results from the increased material temperature. Polymer-based PTC materials (also known as polymer positive coefficient ("PPTC") materials), for instance, may be employed in the present invention. Such materials contain an electrically conductive filler contained within a polymer matrix. The polymer matrix is generally capable of exhibiting two phases. The first phase is a crystalline or semi-crystalline state in which the molecules form long chains and arrange in a regular structure. In this "crystalline" phase, the electrically conductive filler is packed into the crystalline boundaries and forms many conductive paths. At a predetermined temperature correlated with a current overload, this structure transitions by expanding to an amorphous phase that breaks the chain of conductive pathways between the filler. Namely, when current flows through the fuse, it is heated and reaches a constant temperature just above its trip temperature (e.g., about 120° C.). Further breakdown of the capacitor or an additional increase in the current will heat the fuse more, causing it to open and limit the current back to the value, which corresponds to the fuse trip temperature. If the capacitor remains failed and the power is on, the fuse will keep a constant temperature and limit current to the constant value. Although the capacitor may still be able to operate, its leakage current will be higher. The polymer matrix can cool down and return to its normal crystalline state when the source reduces its voltage or is turned off, or when the capacitor heals itself through a self-healing mechanism, thus allowing the filler to again touch and form conductive pathways, upon which the circuit closes and the capacitor may function properly. Thus, the PPTC material is advantageously self-resetting and does not have to be replaced. Examples of such PPTC fuses are commercially available under the designations PolySwitch™ (Tyco Electronics), Everfuse™ (Polytronics), Polyfuse™ (Littelfuse) and Multifuse™ (Bourns).

Any insulative polymer capable of exhibiting the above-described phase change may generally be used to form the polymer matrix. Particularly suitable polymers include semi-crystalline organic polymers, including polyolefins, such as polyethylene (e.g., HDPE, LLDPE, etc.), polypropylene, and copolymers thereof (e.g., ethylene/acrylic acid, ethylene/ethyl acrylate, ethylene/vinyl acetate, ethylene/butyl acrylate, etc.); fluoropolymers, such as polyvinylidene fluoride and ethylene/tetrafluoroethylene; and so forth, as well as blends thereof. Still other suitable polymers that may be employed are described in U.S. Pat. Nos. 4,237,441; 4,388,607; 4,534,889; 4,545,926; 4,560,498; 4,591,700; 4,724,417; 4,774,024; 4,935,156; 5,049,850; and 5,250,228, which are incorporated herein in their entirety by reference thereto for all purposes.

The electrically conductive filler may include, for instance, carbon black, graphite, metal, metal oxide, conductive coated glass or ceramic beads, particulate conductive polymers, etc. The filler may be in the form of powder, beads, flakes, fibers, or any other suitable shape. The quantity of conductive filler employed is based on the required resistivity of the composition and the resistivity of the conductive filler itself. The conductive filler may constitute from about 10% to about 60% by volume, in some embodiments from about 20% to about 55% by volume, and in some embodiments, from about 25% to about 50% by volume of the composition. Likewise, the polymer matrix may constitute from about 40% to about 90% by volume, in some embodiments from about 45% to about 80% by volume, and in some embodiments, from about 50% to about 75% by volume of the composition. It should be understood that the PTC material may also include other components, such as antioxidants, inert fillers, nonconductive fillers, radiation crosslinking agents (often referred to as pro-rads or crosslinking enhancers), stabilizers, dispersing agents, coupling agents, acid scavengers (e.g., $CaCO_3$), or other components.

In addition to polymer-based PTC materials, ceramic-based PTC materials may also be employed in the present invention. One type of suitable ceramic-based PTC material that may be employed includes a matrix of ceramic material having one of a cristobalite crystal structure and a tridymite crystal structure, each doped with an oxide of at least one of Be, B, Mg, Al, Ca, Sc, Ti, V, Cr, Mn, Fe, Co, Ni, Cu, Zn, Ga, and Ge, and a conductive phase dispersed throughout the matrix. The conductive phase may include a metal, silicide, nitride, carbide, boride, etc. During use, the ceramic matrix expands in volume and breaks conductive paths formed by conductive particles dispersed throughout the matrix. In this manner, this particular ceramic-based material behaves similarly to a polymer-based PTC materials. Examples of such ceramic materials are described, for instance, in U.S. Pat. No. 6,300,862 to Ishida, which is incorporated herein in its entirety by reference thereto for all purposes.

Regardless of the PTC material employed, the resettable fuse may be formed entirely from the above-described material or it may contain one or more additional layers. For example, the resettable fuse may contain one or more electrode members positioned adjacent to the PTC material. In one particular embodiment, two electrodes are employed that sandwich the PTC material. The electrode member(s) may be in the form of a metal sheet (e.g., foil, plate, etc.), which may optionally be perforated to contain holes or slits. Any suitable metal may be employed in the electrode member(s), such as nickel, copper, aluminum, brass, zinc, silver, gold, etc. The electrode member(s) may also include one or multiple layers, such as a base layer and surface layer. In one particular embodiment, the electrode member(s) are foil electrodes having a microroughened surface, such as electrodeposited nickel foils and nickel-plated electrodeposited copper foil electrodes. The electrode member(s) may be attached to the PTC material by any suitable method, such as by compression molding, nip lamination, adhesive bonding, etc. Various other examples of suitable electrode configuration for use in the resettable fuse are described in U.S. Pat. Nos. 6,570,483 to Chandler, et al. and 6,651,315 to Graves, et al., which are incorporated herein in their entirety by reference thereto for all purposes.

III. Stress Absorbing Material

The stress absorbing material employed in the fused capacitor assembly of the present invention is configured to help absorb some of the thermal stresses caused by expansion of the resettable fuse. In this regard, the stress absorbing material typically possesses an inherent flexibility that allows it to be subjected to compressive forces. The flexibility of the material may be characterized by a corresponding low modulus of elasticity ("Young's modulus"), such as about 1,000 Megapascals ("MPa") or less, in some embodiments from about 1 to about 750 MPa, and in some embodiments, from about 50 to about 500 MPa, measured at a temperature of about 25° C.

Although any of a variety of materials may be employed that have the desired stress absorbing properties noted above, thermoplastic and/or thermoset polymers have been found to be particularly suitable for use in the present invention. Specific examples of such polymers include, for instance, acrylonitrile-butadiene-styrene, acrylonitrile-chlorinated polyethylene-styrene, acrylic-styrene-acrylonitrile, polyacetal homopolymers and copolymers, acrylics, cellulosics, fluoropolymers, polyamides, polyacrylates, polybutylene, polycarbonates, polyesters, polyethylenes, ethylene acid copolymers, ethylene-ethyl acrylates, ethylene-methyl acrylates, polymethyl acrylate, polymethyl methacrylate, polybutyl methacrylate, ethylene-vinyl acetates, ethylene vinyl alcohol copolymers, ionomers, polymethylpentene, polyphenylene oxides, polypropylene, ethylene-propylene copolymers, polypropylene impact copolymers, polypropylene random copolymers, polystyrenes, styrene-acrylonitrile, styrene-butadiene copolymers, styrene-ethylene/butylene-styrene, styrene-maleic anhydride copolymers, polyvinyl chloride, polyvinyl chloride, vinylidene chloride homopolymers and copolymers, styrenic block copolymers, polyolefin blends, elastomeric alloys, thermoplastic urethanes, polyethylene terephthalate, polybutylene terephthalate, thermoplastic copolyesters, polyethers, thermoplastic polyamides, polyether-polyamide block copolymers, allyl molding compounds, bis-maleimides, epoxy resins, phenolic resins, polyesters, ethylene-propylene diene terpolymers such as EPDM rubber, polyimides, ionomers, polyurethanes, segmented polyurea/urethanes, reaction injection molded polyurethanes, polyorganosiloxanes, urea-melamine formaldehyde resins, polyacetals, polyesters, polyamides, ionomers, etc., as well as blends of the foregoing.

Polyorganosiloxanes, for instance, may be employed in certain embodiments as a stress absorbing material. The polyorganosiloxanes may have a linear, partially branched, or a branched structure. Silicon-bonded organic groups used in these polymers may contain substituted or non-substituted monovalent hydrocarbon groups such as methyl, ethyl, propyl, butyl, pentyl, hexyl, heptyl, octyl, decyl, dodecyl, or similar saturated aliphatic hydrocarbon groups; vinyl, allyl, hexenyl, or similar unsaturated aliphatic hydrocarbon groups; cyclopentyl, cyclohexyl, or similar saturated alicyclic hydrocarbon groups; phenyl, tolyl, naphthyl, or similar aromatic hydrocarbon groups, or aforementioned groups, in which hydrogen atoms bonded to their carbon atoms are partially substituted by halogen atoms or by organic groups such as epoxy, carboxyl, amino, methacrylic, or mercapto groups. The polyorganosiloxanes may also contain alkoxy groups or hydroxyl groups bonded to silicon atoms. Specific examples of suitable polyorganosiloxanes include polymethylhydrogensiloxane, dihydroxypolydimethylsiloxane, hydroxy-trimethylsiloxypolydimethylsiloxane, dimethoxypolydimethylsiloxane, methoxy-trimethylsiloxypolydimethylsiloxane, diethoxypolydimethylsiloxane, ethoxy-trimethylsiloxypolydimethylsiloxane, di(trimethylsiloxy)polydimethylsiloxane, silanol-capped crosslinked polymethylsiloxane, methoxy-capped crosslinked polymethylsiloxane, ethoxy-capped crosslinked polymethylsiloxane, trimethylsiloxy-capped crosslinked polymethylsiloxane, etc. If desired, one or more of the methyl groups of the polyorganosiloxanes may be substituted, such as with ethyl groups, phenyl groups, vinyl groups, 3-aminopropyl groups, N-(2-aminoethyl)-3-aminopropyl groups, 3-methacryloxypropyl groups, 3-glycidoxy-propyl groups or 3-carboxypropyl groups.

The stress absorbing material may also contain a maleimide resin, such as mono-, bis-, tris-, tetrakis-, and higher functional maleimides. In one embodiment, for example, a maleimide resin may be employed that has the following structure:

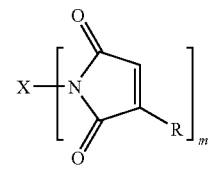

wherein:

m is 1 to 6,

R is independently selected from hydrogen or lower alkyl, and

X is a monovalent moiety or a multivalent linking moiety. Suitable linking moieties may include, for instance, straight or branched chain alkyl, alkylene, oxyalkylene, alkenyl, alkenylene, oxyalkenylene, ester, or polyester, optionally containing substituents selected from hydroxy, alkoxy, carboxy, nitrile, cycloalkyl or cycloalkenyl; siloxanes; polyalkylene oxides; aromatic moieties; urethanes; and so forth, such as described in U.S. Patent Application Publication No. 2005/0107542 to Liu, et al., which is incorporated herein in its entirety by reference thereto for all purposes.

If desired, a thermoplastic elastomer may also be employed in the stress absorbing material, either alone or in conjunction with any of the aforementioned materials. Suitable thermoplastic elastomers include block copolymers having at least one unit of the general formula (A-B), or (A-B-A), wherein A is a non-elastomeric polymer block and B is an elastomeric polymer block. For instance, the non-elastomeric polymer block (A) may be the polymerization product of one or more optionally substituted aromatic hydrocarbons containing at least one unit of ethylenic unsaturation, such as styrene or styrene substituted with alkyl, alkenyl, alkynyl, hydroxy, alkoxy, alkenoxy, etc. The elastomeric polymer block (B) is typically the polymerization or copolymerization product of optionally substituted olefin monomers and/or optionally substituted conjugated diene monomers. Olefin monomers may be ethylene, propylene, butylene, isobutylene, acrylonitrile, (meth)acrylate, etc. Conjugated diene monomers may be butadiene, isoprene, dimethylbutadiene, etc. Specific examples of such elastomers include polystyrene-polybutadiene-polystyrene block copolymers, polystyrene-polyisoprene-polystyrene block copolymers, polystyrene-polydimethylbutadiene-polystyrene block copolymers, polybutadiene-polyacrylonitrile block copolymers, and so forth.

In certain cases, the viscosity of the stress absorbing material may be relatively low so that it may be more easily deposited onto the desired surface. For example, the stress absorbing material may have a kinematic viscosity of about 500 centistokes or less, in some embodiments about 200 centistokes or less, in some embodiments from about 1 centistokes to about 100 centistokes, and in some embodiments, from about 5 to about 50 centistokes. One example of such a low viscosity material is Dow Corning™ MH 1107, which contains polymethylhydrogen siloxane and has a viscosity ranging from 20 to 30 centistokes.

Of course, high viscosity stress absorbing materials may also be employed, such as those having a kinematic viscosity of about 500 centistokes or more, in some embodiments about 1000 centistokes or more, in some embodiments from about 5,000 centistokes to about 50,000 centistokes, and in some embodiments, from about 10,000 to about 20,000 centistokes. Although possessing a relatively high viscosity, such materials may be effectively deposited onto the desired surface by forming an emulsion with the aid of solvents (e.g., water, methanol, etc.), emulsifiers, etc. The solids content of such emulsions may be from about 5 wt. % to about 75 wt. %, in some embodiments from about 10 wt. % to about 70 weight %, and in some embodiments, from about 25 wt. % to about 60 wt. %. One example of a particularly suitable emulsion is Dow Corning™ 1101, which is an aqueous emulsion of high viscosity, silanol terminated polydimethylsiloxane (53% active, anionic). Other suitable silicone emulsions may include Dow Corning™ HV600 (a nonionic 55% trimethylsilyl terminated polydimethylsiloxane dispersion), Dow Corning™ 1664 (a nonionic 50% trimethylsilyl terminated polydimethylsiloxane dispersion), Dow Corning™ 346 (a non-ionic, 60% active trimethylsilyl terminated polydimethylsiloxane emulsion), etc.

In addition to polymers, such as described above, the stress absorbing material may also include other additives. For example, the stress absorbing material may include a filler to reduced thermal expansion, provide improved toughness, etc. Examples of such fillers include perfluorinated hydrocarbon polymers (i.e., TEFLON™), thermoplastic polymers, thermoplastic elastomers, mica, fused silica, glass powder, etc. One examples of a filler-containing stress absorbing material that may be employed is Hysol™ QMI 534 (Loctite), which contains a bis-maleimide and polybutadiene/anhydride resin filled with Teflon™.

IV. Fused Capacitor Assembly

The electrolytic capacitor element, resettable fuse, and stress absorbing material of the present invention are contained within a case to form a capacitor assembly. The configuration of the assembly is not particularly limited and may vary depending on the intended application. In this regard, FIG. 1 illustrates one embodiment of a capacitor assembly 10 that includes an electrolytic capacitor element 20 and a resettable fuse 30 contained within an encapsulation case 158. The encapsulation case 158 provides electrical and thermal protection to the assembly 10, as well as additional structural support. The width and length of the case 158 may vary depending on the intended application. In one embodiment, for example, the length of the case 158 (−y direction in FIG. 1) is from about 2.0 to about 10.0 millimeters, in some embodiments from about 2.5 to about 8.0 millimeters, and in some embodiments, from about 3.0 to about 6.5 millimeters. The width of the case 158 (−x direction in FIG. 1) may range from about 1.0 to about 5 millimeters, in some embodiments from about 1.5 to about 4.5 millimeters, and in some embodiments, from about 2.0 to about 3.5 millimeter. The overall thickness of the case 158 (−z direction in FIG. 1) may optionally remain small so that the resultant assembly is readily incorporated into low profile products. For example, the thickness of the casing may be about 5.0 millimeters or less, in some embodiments, from about 0.4 to about 3.5 millimeters, and in some embodiments, from about 0.5 to about 3.0 millimeters. Suitable case sizes may include, for instance, "B", "C", "D", "E", "V", or "Z" cases (AVX Corporation).

In the embodiment illustrated in FIG. 1, the resettable fuse 30 is positioned adjacent and electrically connected to an upper surface 21 of the electrolytic capacitor element 20 and thus in electrical contact with its cathode. Of course, it should be understood that the resettable fuse 30 may also be positioned at other locations within the capacitor assembly 10. For example, in another embodiment, the resettable fuse 30 may be positioned adjacent to a lower surface 22 of the capacitor element 20. Still further, the resettable fuse 30 may simply be connected to an anode lead 80 without physically contacting any surface of the element 20. Regardless of it location, any known technique may generally be employed to connect the capacitor element 20 to the resettable fuse 30, such as welding, laser welding, adhesive bonding, etc. For example, in the illustrated embodiment, a layer of conductive adhesive 25 is used to connect the resettable fuse 30 to the capacitor element 20.

The capacitor assembly 10 also includes an anode termination 40 and a cathode termination 50. Any conductive material may be employed to form the terminations, such as a conductive metal (e.g., copper, nickel, silver, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The particular configuration of the terminations is not critical and may vary as is known in the art. In FIG. 1, for instance, the anode termination 40 is electrically connected to the anode lead 80 using any known technique, such as welding, laser welding, etc. If desired, the anode termination 40 may contain a "U-shaped" region for carrying the anode lead 80 that further enhances surface contact and mechanical stability. The cathode termination 50 is, in this embodiment, electrically connected to the resettable fuse 30. Electrical connection of the cathode termination 50 to the resettable fuse 30 may be established using any known technique, such as through the use of a layer of conductive adhesive 27.

The conductive adhesive layer 27, as well as the conductive adhesive layer 25, may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes. If desired, the material(s) used to form the adhesive layers 25 and/or 27 may have a low modulus of elasticity so that they are flexible. For example, the modulus of elasticity of the adhesive layers 25 and/or 27 may be about 5,000 Megapascals ("MPa") or less, in some embodiments from about 1 to about 2,500 MPa, and in some embodiments, from about 50 to about 2,000 MPa, measured at a temperature of about 25° C.

Referring again to FIG. 1, the capacitor assembly 10 also includes a stress absorbing material in contact with the resettable fuse 30. The stress absorbing material may contact any surface of the resettable fuse 30 desired. In FIG. 1, for example, a first stress absorbing material 90 is provided that contacts an upper and front surface of the resettable fuse 30. A second stress absorbing material 35 is also provided that contacts a rear surface of the fuse 30 and positioned between the fuse 30 and the cathode termination 50. The second stress absorbing material 35 may likewise be positioned between the fuse 30 and the anode termination 40. Regardless, the stress absorbing materials 90 and 35 are able to absorb thermal tensile or compressive stress caused by the difference in the thermal expansion coefficients of the resettable fuse 30 and the encapsulation resin 158. This in turn allows the resettable fuse 30 to expand to the desired extent when exposed to an excessive current, and thus function more effectively in the capacitor assembly 10. If desired, the stress absorbing material may also provide protection against short circuiting of the fuse through the use of an additional amount of adhesive. Although not necessarily required, it is often desired that the stress absorbing material(s) are also in contact with other components of the capacitor assembly 10, such as the cathode and/or anode terminations, the capacitor element, etc. For example, as shown in FIG. 1, the stress absorbing materials 90 and 35 also contact a surface of the cathode termination 50. Further, the stress absorbing material contacts a surface of the capacitor element 22.

Stress absorbing materials may be deposited using known methods such as, dipping, spraying, printing, molding, extrusion, etc. The coated capacitor element may then be allowed to dry, either under ambient conditions or in a heating step, so that most, if not all, of any solvent is removed and/or the polymer(s) may be crosslinked. For example, the capacitor element may be heated in one or more steps at a temperature of from about 100° C. to about 300° C., in some embodiments from about 110° C. to about 200° C., and in some embodiments, from about 120° C. to about 180° C. Heating may occur in air, or under a controlled atmosphere (e.g., under vacuum). The final dried coating typically possesses the stress absorbing material in an amount of about 80 wt. % to 100 wt. %, in some embodiments, from about 85 wt. % to about 99.9 wt. %, and in some embodiments, from about 90 wt. % to about 99 wt. %. As a result of the present invention, the resulting capacitor assembly of the present invention may exhibit excellent electrical properties. For example, the assembly may achieve a relatively low equivalent series resistance ("ESR"). For example, the ESR may be about 1,000 milliohms or less, in some embodiments about 300 milliohms or less, and in some embodiments, about 150 milliohms or less, measured with a 2-volt bias and 1-volt signal at a frequency of 100 kHz. It is also believed that the dissipation factor (DF) of the capacitor assembly may also be maintained at relatively low levels. The dissipation factor (DF) generally refers to losses that occur in the capacitor assembly and is usually expressed as a percentage of the ideal performance. For example, the dissipation factor of a capacitor assembly of the present invention is typically less than about 15%, and in some embodiments, less than about 5%, measured at a frequency of 120 Hz. The peak surge current may likewise be about 5.0 Amps or more, in some embodiments, about 10.0 Amps or more, and in some embodiments, from about 15.0 to about 50.0 Amps.

The present invention may be better understood by reference to the following example.

Test Procedures

Equivalent Series Resistance (ESR), Capacitance, Dissipation Factor, and Impedance:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 0 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 40 seconds.

Figure 8:
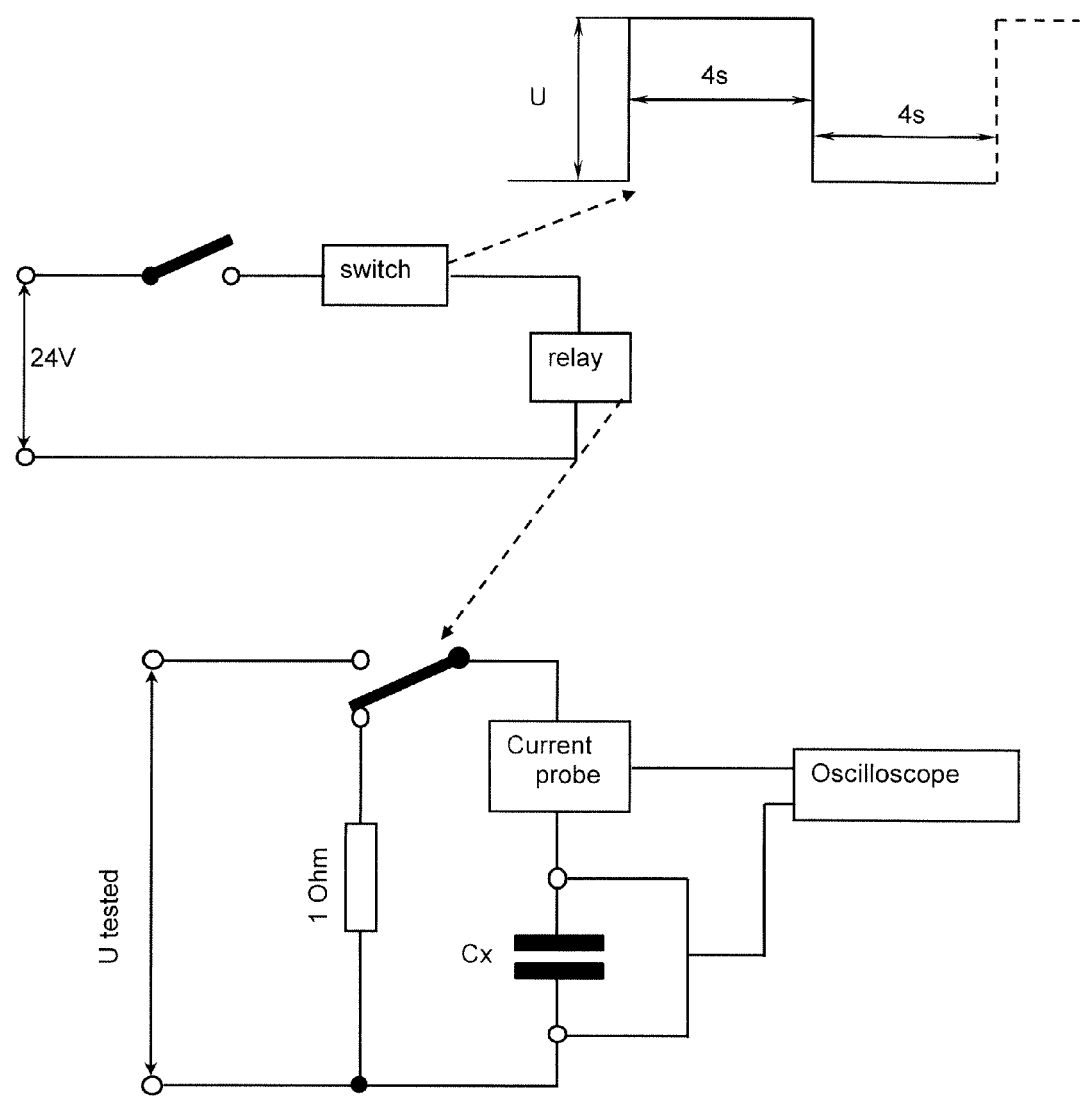
FIG. 8 is a schematic diagram of the switch relay used in testing the capacitors of the Examples.

Trip Time Testing:

A power supply (Sorensen DCR 150-12B, 0-150V; 0-15A) was used as a voltage source. A capacitor was connected in parallel with a resistor (1 ohm) through a switch relay as shown in FIG. 8. The trip time of the fuse and the time dependence of current in capacitor was monitored by oscilloscope (Fluke 99B) connected in parallel with the capacitor and an AC/DC current probe (Fluke 80i-110s), connected in series. Testing of the fused capacitors (function of fuses) was performed at a rated voltage in the capacitor reverse mode (positive pole was on the cathode). 10 pulses (4 seconds on, 4 seconds off) were applied by means of the switch relay. The current was measured by the current probe and monitored together with voltage on oscilloscope. The number of burnt units was evaluated.

EXAMPLE 70,000 μFV/g tantalum powder (HC Starck) was pressed into pellets and sintered to form a porous electrode body of size 5.4×3.75×1.25 mm. Anodic oxidation was then carried out in an aqueous solution containing phosphoric acid. The voltage was chosen to obtain a targeted capacitance of 330 μF at a rated voltage of 6.3V. After anodic oxidation, the pellets were coated with a manganese dioxide layer, a graphite coating and a silver coating by conventional technology known to the skilled in art.

Figure 2:
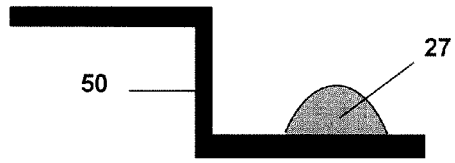
FIGS. 2-7 illustrate various steps that may be used to manufacture the fused capacitor assembly of FIG. 1.
Figure 3:
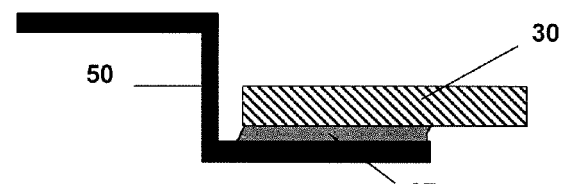
Figure 4:
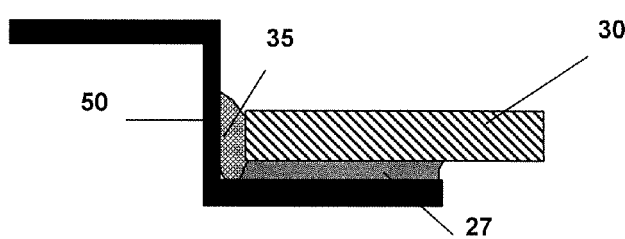
Figure 5:
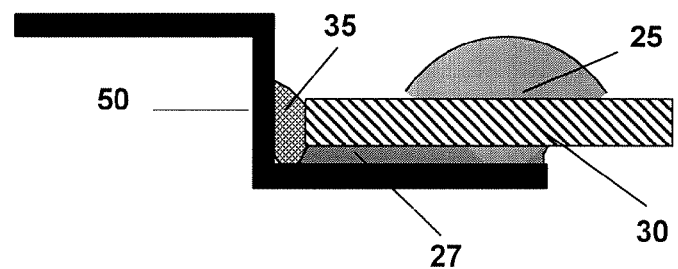
Figure 6:
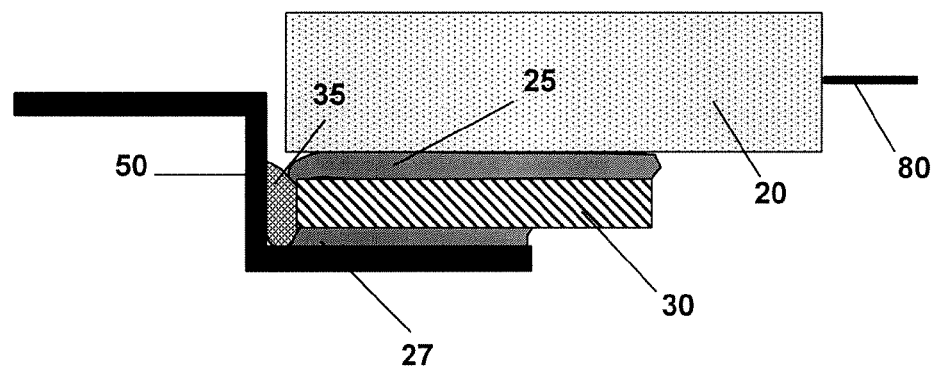
Figure 7:
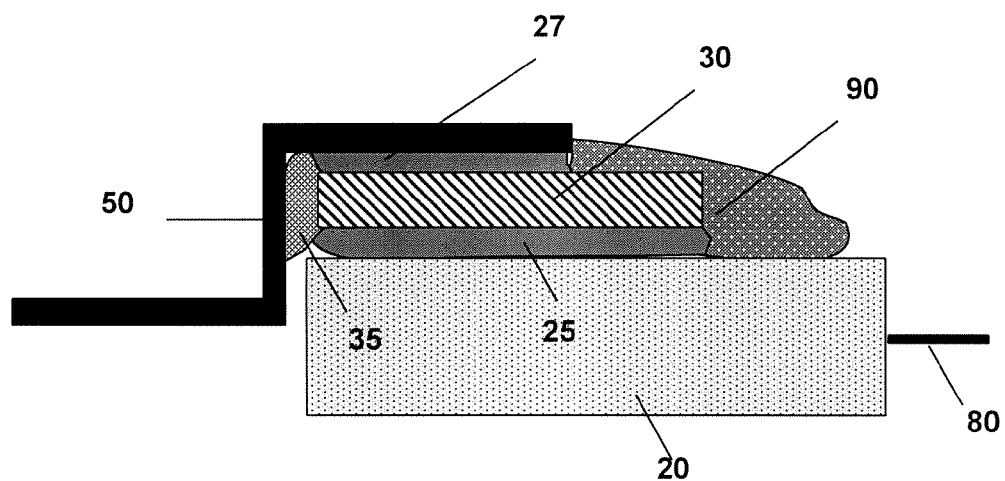

PPTC fuses were obtained from Tyco Raychem under the designation "Fluo-2", which had a size of 3.6×3.6×0.5 mm. The fuses were based on a fluoroelestomer polymer filled with nickel conductive particles and contained gold-plated nickel contact layers on the large areas. The pellets were assembled with the PPTC fuses to the D case (EIA 7348) as shown in FIGS. 2-7. More specifically, a flexible silver loaded epoxy adhesive 27 (XCE80239 Emerson & Cuming) was dispensed into the pocket of a leadframe 50 (FIG. 2). Three (3) equally sized dots having a volume 0.020 mm³ were applied to allow uniform distribution of the paste over the leadframe pocket 50. The PPTC fuse 30 (Fluo 2, Tyco Raychem) was placed on the wet adhesive 27 (FIG. 3). The adhesive was then cured in the static oven at 150° C. for 15 minutes. A first stress absorbing material 35 (QMI 534, Loctite) was applied between the fuse 30 and leadframe pocket 50 from the side adjacent to the vertical part of the leadframe and cured at 150° C. for 15 minutes (FIG. 4). A flexible silver-loaded epoxy adhesive 25 (XCE80239-Emerson &Cuming) was then dispensed on the top surface of the fuse element 30, assembled to the leadframe 50 (FIG. 5). The capacitor pellet 20 was placed on the wet adhesive and anode wire 80 was laser welded to the leadframe 50 (FIG. 6). The adhesive was then cured at 190° C. for 45 seconds. The entire assembly was turned upside down and a 0.5 mm³ dot of stress absorbing material 90 (Dow Corning 1107) was dispensed on the edge of the fuse 30 so that the dot spread over the fuse 30 from the side facing to the anode wire 80 and over the fuse surface not covered by leadframe 50 and adhesive 27 (FIG. 7). The material 90 was then cured at 150° C. for 20 minutes. The assembly was then encapsulated with a silica filled molding resin.

The capacitance, dissipation factor, impedance, and ESR of the resulting capacitors (180 samples) were then tested and compared to samples formed as described above, except without the stress absorbing materials 35 and 90. The results are shown below in Tables 1 and 2.

TABLE 1

Properties of Capacitors With Stress Absorbing Material

|  | Capacitance (μF) | Dissipation Factor (%) | Impedance (mOhm) | ESR (mOhm) | Leakage Current (μA) |
|---|---|---|---|---|---|
| Minimum | 284.0 | 2.3 | 62.2 | 60.2 | 1.30 |
| Median | 300.0 | 3.1 | 80.2 | 78.5 | 1.60 |
| Maximum | 329.0 | 5.1 | 114.3 | 113.1 | 2.10 |
| Std. Dev. | 6.7 | 0.6 | 12.9 | 13.1 | 0.15 |

TABLE 2

Properties of Capacitors Without Stress Absorbing Material

|  | Capacitance (μF) | Dissipation Factor (%) | Impedance (mOhm) | ESR (mOhm) | Leakage Current (μA) |
|---|---|---|---|---|---|
| Minimum | 276.0 | 2.3 | 56.6 | 54.7 | 1.40 |
| Median | 299.0 | 3.0 | 70.4 | 68.9 | 1.60 |
| Maximum | 330.0 | 5.6 | 123.4 | 123.0 | 2.70 |
| Std. Dev. | 9.6 | 0.6 | 10.2 | 10.4 | 0.20 |

120 of the above-described capacitors (with and without stress absorbing material) were then subjected to the trip time test described above (10 pulses, 4 sec on/4 sec off in reverse at rated voltage of 6.3V). The results are shown below in Table 3.

TABLE 3

Effect of Stress Absorbing Material on the Burning of Capacitors

|  | Tested [parts] | Good [parts] | Burned [parts] | Burned [%] |
|---|---|---|---|---|
| Without stress absorbing material | 30 | 19 | 11 | 37 |
| With stress absorbing material | 30 | 30 | 0 | 0 |

As indicated above, none of the capacitor assemblies containing a stress absorbing material burned during testing.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fused electrolytic capacitor assembly comprising:
   an electrolytic capacitor element comprising an anode and solid electrolyte overlying the anode, wherein an anode lead extends from the anode;
   a resettable fuse electrically connected to the electrolytic capacitor element, the resettable fuse containing a positive temperature coefficient ("PTC") material;
   a stress absorbing material covering at least a portion of the resettable fuse;
   a cathode termination that is electrically connected to the solid electrolyte;
   an anode termination that is electrically connected to the anode lead; and
   a case that encapsulates the electrolytic capacitor element and the resettable fuse and leaves at least a portion of the anode and cathode terminations exposed.

2. The fused electrolytic capacitor assembly of claim 1, wherein the electrolytic capacitor element contains an anode formed from a valve metal composition.

3. The fused electrolytic capacitor assembly of claim 2, wherein the valve metal composition includes tantalum.

4. The fused electrolytic capacitor assembly of claim 2, wherein the valve metal composition includes niobium oxide.

5. The fused electrolytic capacitor assembly of claim 1, wherein the solid electrolyte contains manganese oxide.

6. The fused electrolytic capacitor assembly of claim 1, wherein the solid electrolyte contains a conductive polymer.

7. The fused electrolytic capacitor assembly of claim 1, further comprising a dielectric layer formed between the anode and the solid electrolyte.

8. The fused electrolytic capacitor assembly of claim 1, wherein the PTC material contains an electrically conductive filler contained within a polymer matrix.

9. The fused electrolytic capacitor assembly of claim 1, wherein the PTC material contains a ceramic.

10. The fused electrolytic capacitor assembly of claim 1, wherein the resettable fuse further comprises one or more electrode members positioned adjacent to the PTC material.

11. The fused electrolytic capacitor assembly of claim 1, wherein the stress absorbing material has a modulus of elasticity of about 1,000 Megapascals or less.

12. The fused electrolytic capacitor assembly of claim 1, wherein the stress absorbing material has a modulus of elasticity of from about 50 to about 500 Megapascals.

13. The fused electrolytic capacitor assembly of claim 1, wherein the stress absorbing material includes a polyorganosiloxane.

14. The fused electrolytic capacitor assembly of claim 1, wherein the stress absorbing material includes a bis-maleimide resin.

15. The fused electrolytic capacitor assembly of claim 1, wherein the stress absorbing material further includes a polymer and a filler.

16. The fused electrolytic capacitor assembly of claim 1, further comprising a conductive adhesive layer that is positioned between and electrically connects the electrolytic capacitor element and the resettable fuse.

17. The fused electrolytic capacitor assembly of claim 1, wherein the resettable fuse is electrically connected to the cathode termination.

18. The fused electrolytic capacity assembly of claim 17, further comprising a conductive adhesive layer that is positioned between and electrically connects the resettable fuse and the cathode termination.

19. The fused electrolytic capacitor assembly of claim 17, wherein the stress absorbing material covers at least a portion of the cathode termination.

20. The fused electrolytic capacitor assembly of claim 1, wherein the stress absorbing material is positioned between the resettable fuse and at least a portion of the cathode termination or the anode termination.

21. The fused electrolytic capacitor assembly of claim 1, wherein the resettable fuse is electrically connected to the anode termination.

22. A method of forming a fused electrolytic capacitor assembly, the method comprising:
    providing an electrolytic capacitor element comprising an anode and solid electrolyte overlying the anode, wherein an anode lead extends from the anode;
    electrically connecting the solid electrolyte to a cathode termination;
    electrically connecting the anode lead to an anode termination;
    electrically connecting a resettable fuse to the electrolytic capacitor element, the resettable fuse containing a positive temperature coefficient ("PTC") material;
    covering at least a portion of the resettable fuse with a stress absorbing material; and
    encapsulating the electrolytic capacitor element and the resettable fuse so that at least a portion of the anode termination and the cathode termination remains exposed.

23. The method of claim 22, wherein the valve metal composition includes tantalum or niobium oxide.

24. The method of claim 22, wherein the PTC material contains an electrically conductive filler contained within a polymer matrix.

25. The method of claim 22, wherein the stress absorbing material has a modulus of elasticity of about 1,000 Megapascals or less.

26. The method of claim 25, wherein the stress absorbing material is applied as an emulsion.

27. The method of claim 22, wherein the resettable fuse is connected to the electrolytic capacitor element with a conductive adhesive.

28. The method of claim 22, further comprising electrically connecting the resettable fuse to the cathode termination or anode termination.

29. The method of claim 28, wherein the resettable fuse is connected to the cathode termination or anode termination with a conductive adhesive.

30. The method of claim 28, wherein the stress absorbing material covers at least a portion of the cathode termination or anode termination.

* * * * *